UNITED STATES PATENT OFFICE.

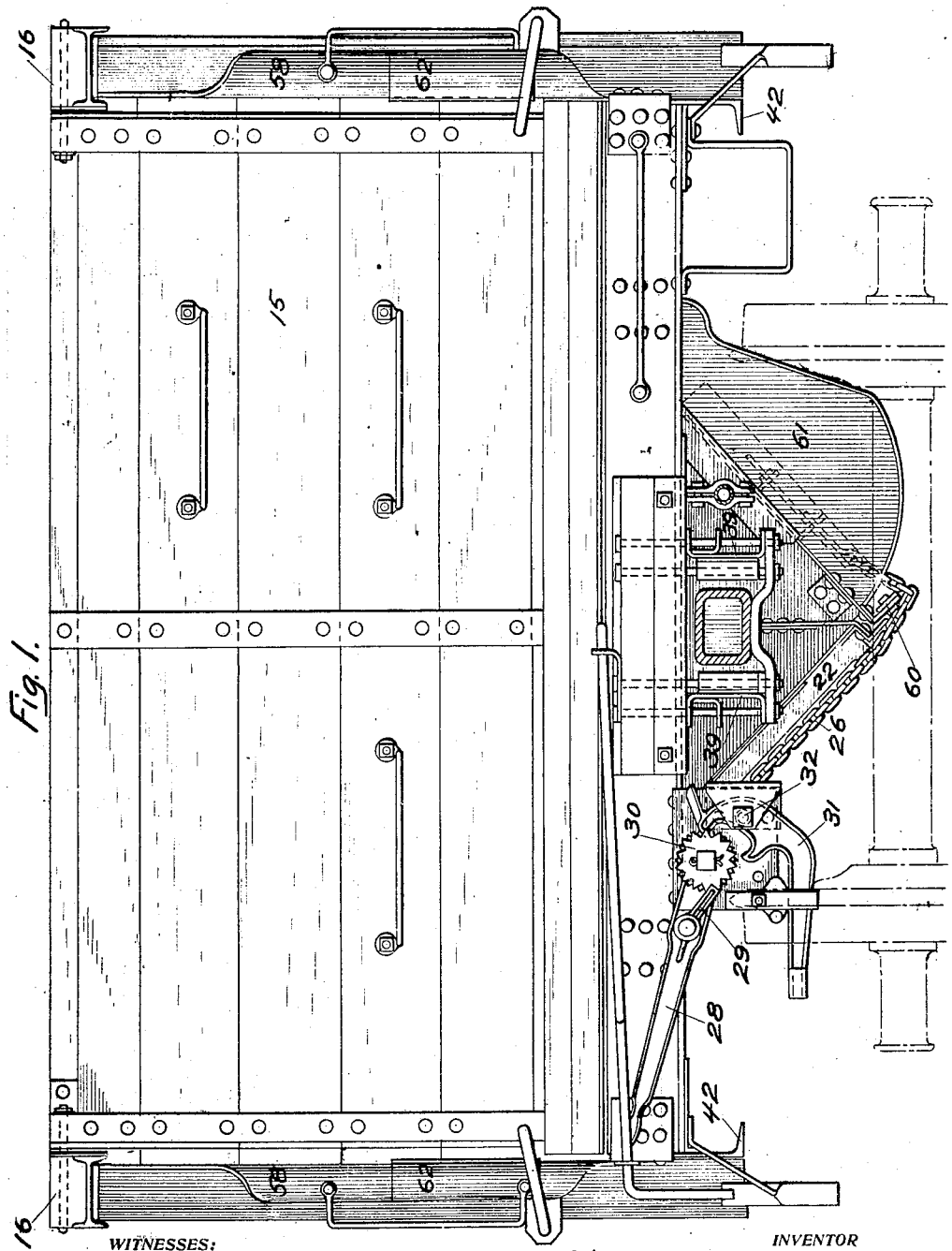

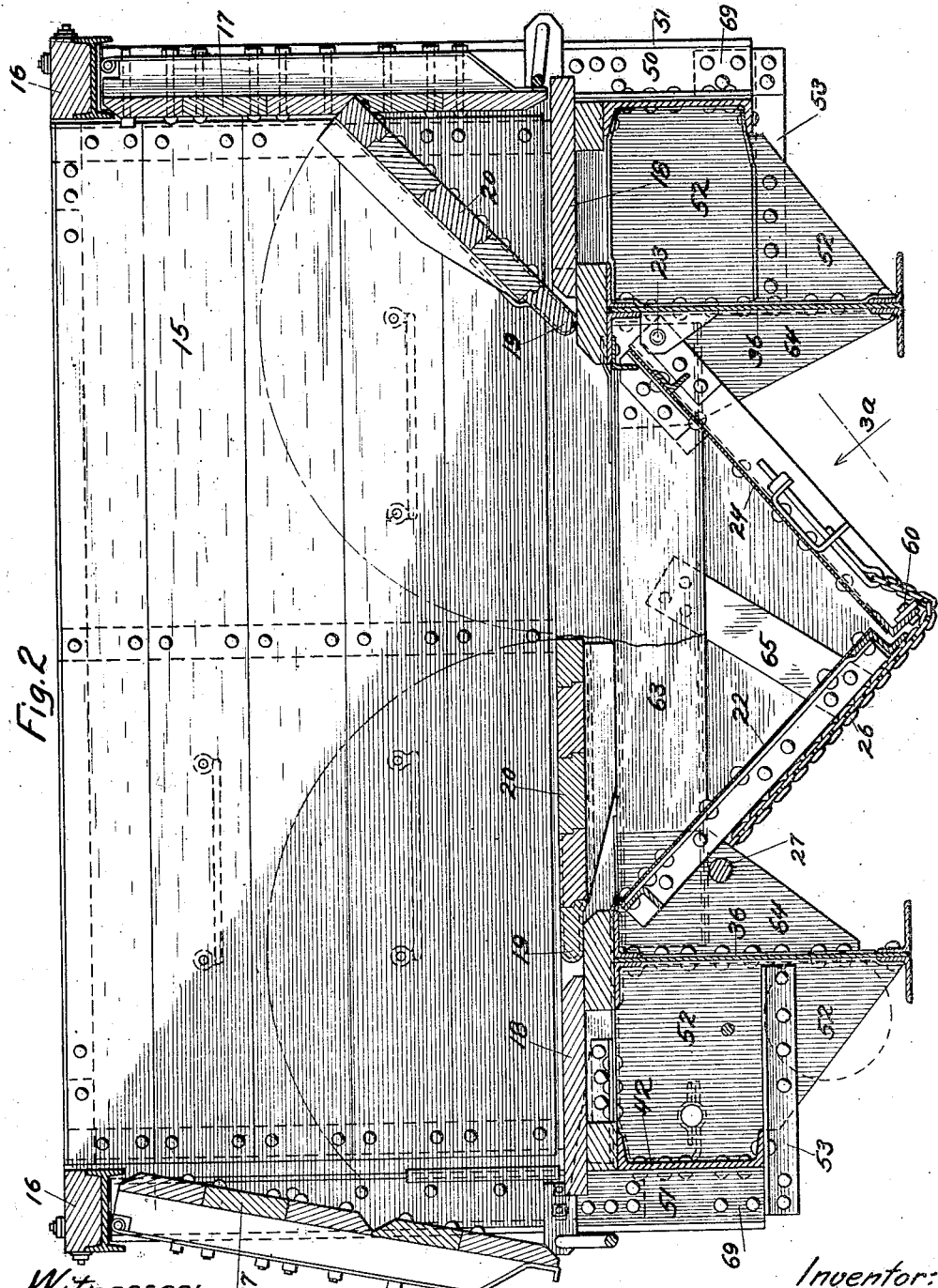

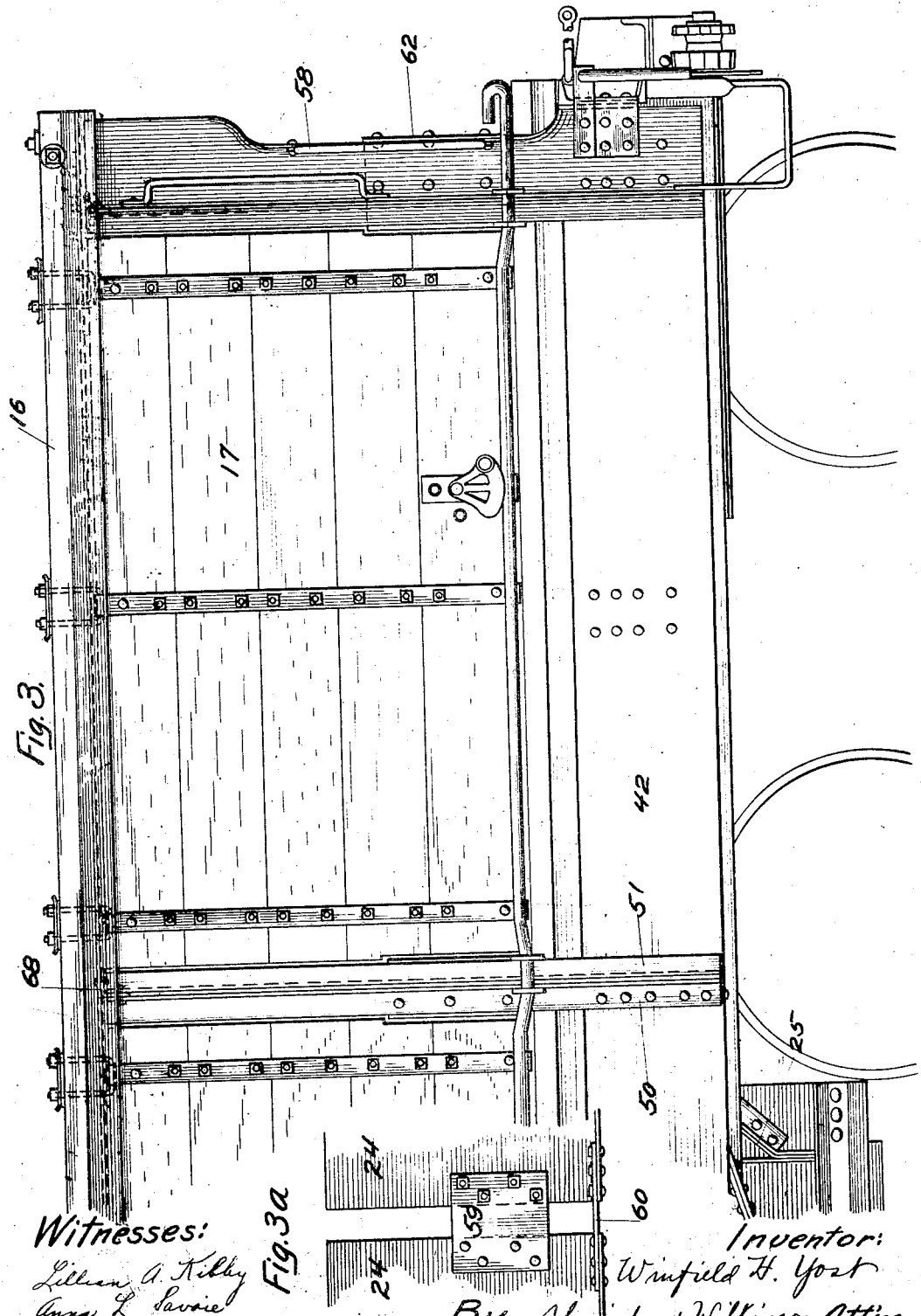

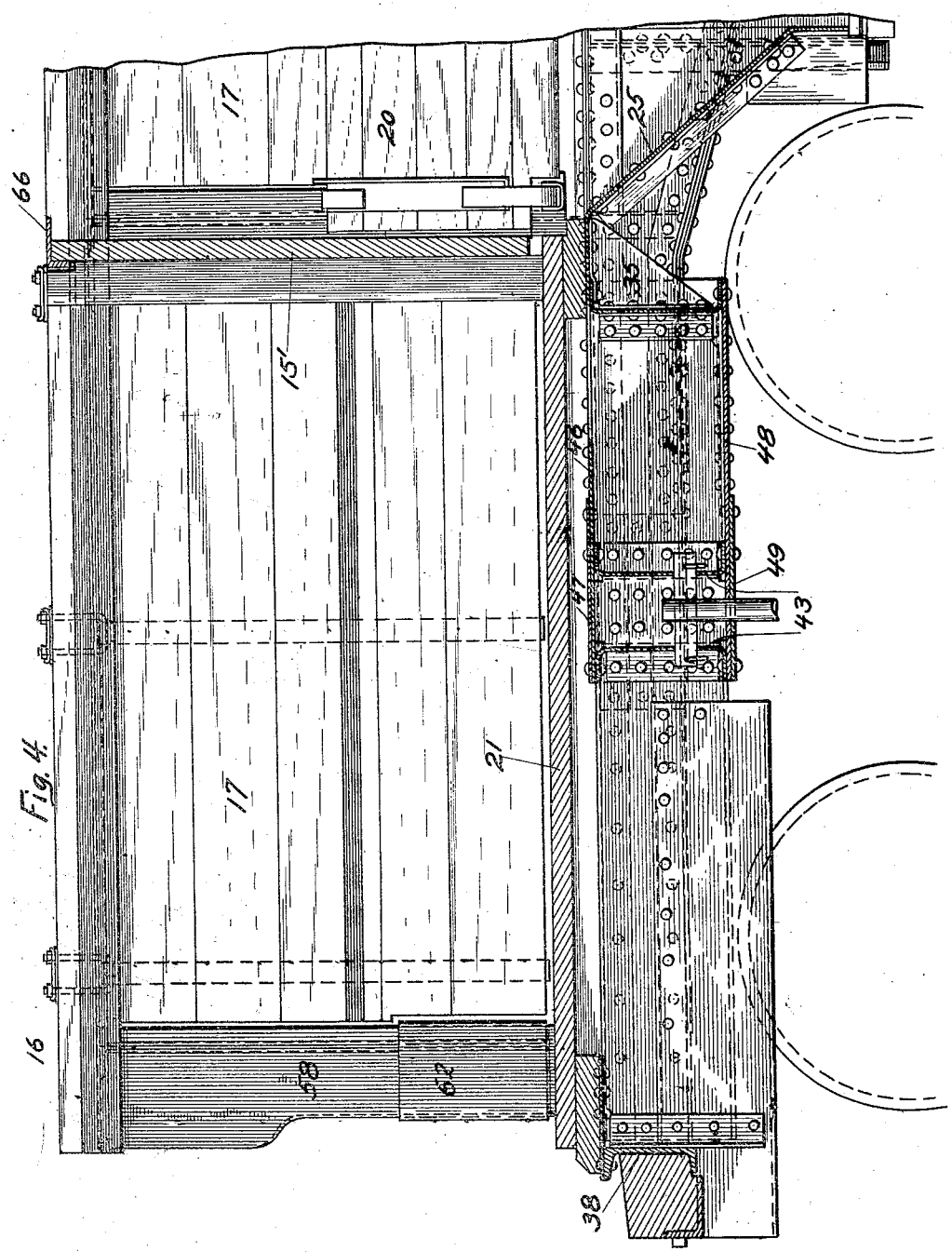

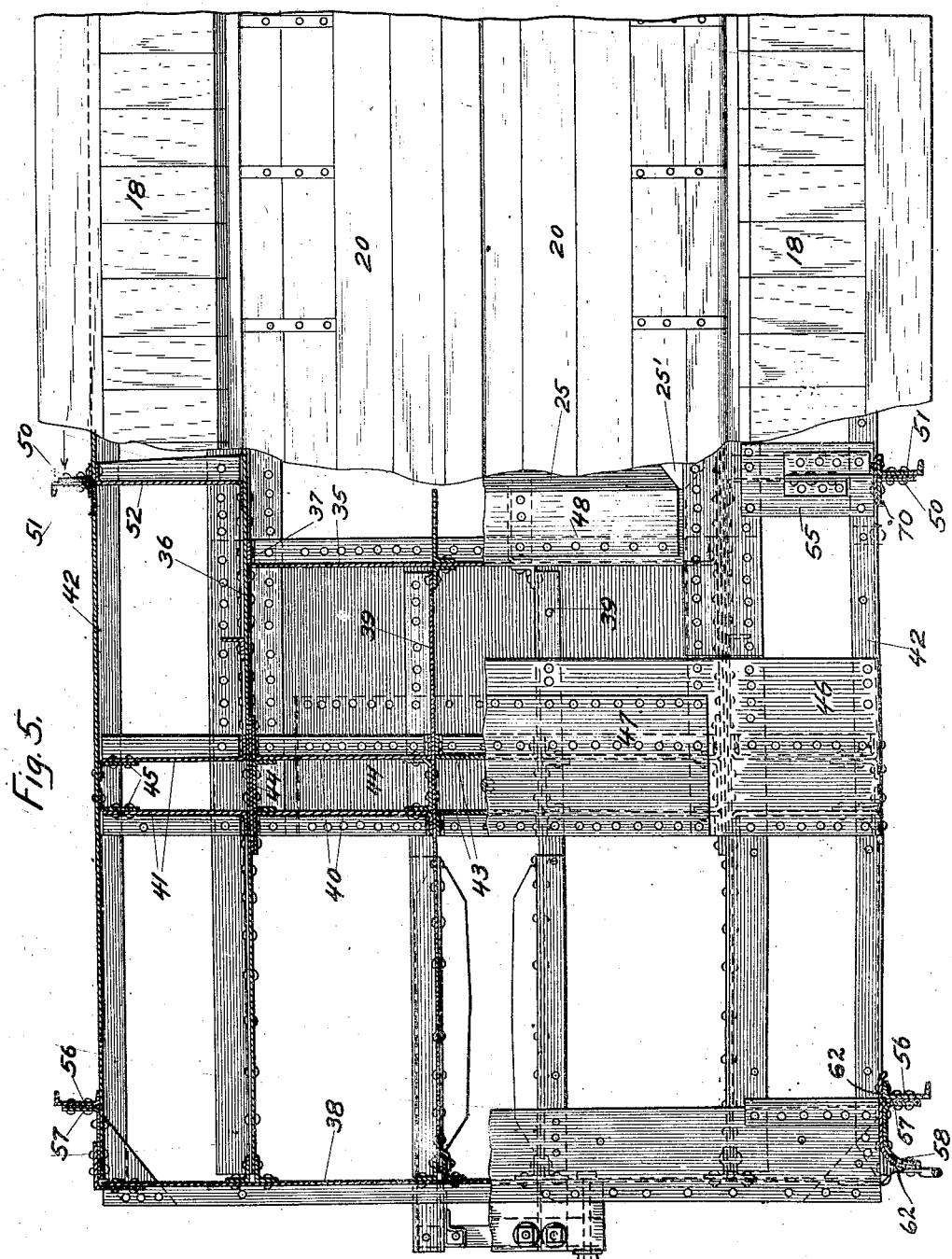

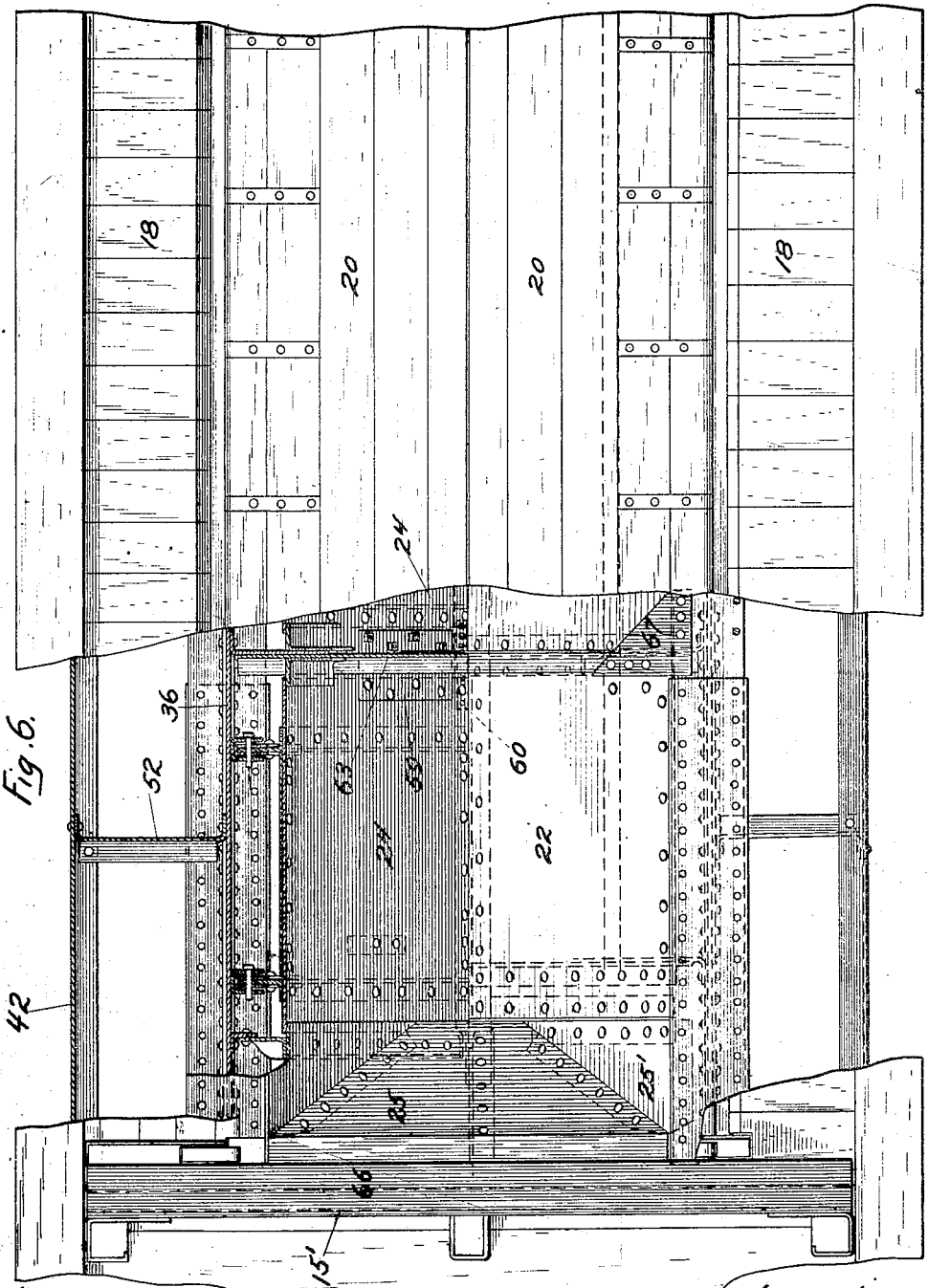

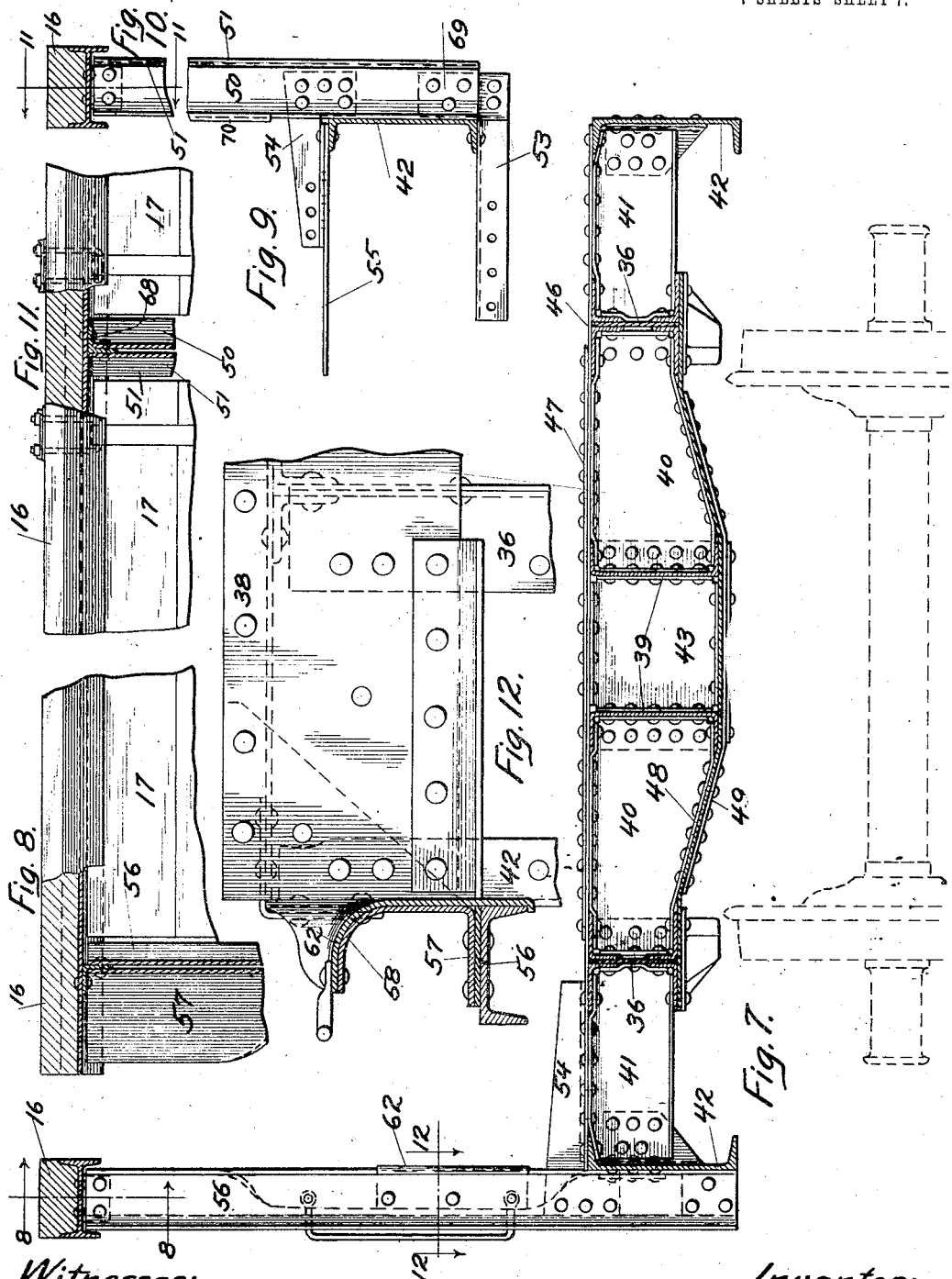

WINFIELD H. YOST, OF MONTREAL, QUEBEC, CANADA, ASSIGNOR TO RODGER BALLAST CAR COMPANY, OF CHICAGO, ILLINOIS, A CORPORATION OF MAINE.

CAR.

1,083,977.

Specification of Letters Patent.   Patented Jan. 13, 1914.

Application filed July 6, 1908.   Serial No. 442,106.

*To all whom it may concern:*

Be it known that I, WINFIELD H. YOST, a citizen of the United States, residing at Montreal, in the county of Hochelaga, Province of Quebec, Canada, have invented certain new and useful Improvements in Cars, of which the following is a specification.

The object of my invention is to provide a new and improved dump car.

Other objects are to provide a hopper bottom dump car having an improved construction of the under framework between the end of the car and the hopper; to provide an improved side stake and connection between the same and the under framework of the car; to provide improved corner stakes that shall be adapted to properly coact with an unloading plow; to provide a sectional construction of dump car doors; and to provide means for properly directing the dumped material as it discharges through the door opening.

These and various other objects will be made apparent in the following specification and claims taken in connection with the accompanying drawings. In the particular embodiment of my invention which I have chosen to illustrate and describe all these objects have been attained in a convertible dump car which is adapted to be operated either as a flat bottom car dumping through the side walls, or as a hopper bottom car dumping through a bottom door.

In the drawings—Figure 1 is an end elevation of the car. Fig. 2 is a transverse section. Fig. 3 is a side elevation of one end of the car. Fig. 3ᵃ is a view of a detail of the door construction looking in the direction of the arrow designated 3ᵃ in Fig. 2. Fig. 4 is a vertical longitudinal section through one end of the car. Fig. 5 is a top plan view of one end, the parts being shown sectionally. Fig. 6 is a top plan view of the intermediate part of the car, certain parts being shown sectionally. Fig. 7 is a transverse section of the car through the body bolster also showing a corner stake in elevation. Fig. 8 is a section on the line 8, 8 of Fig. 7, this view being enlarged somewhat. Fig. 9 is a detail view showing the side stake in elevation in its relation to the side sill which is shown in section. Fig. 10 shows the top end of the side stake in elevation and the top rail of the side wall of the car in section. Fig. 11 is a section on the line 11, 11 of Fig. 10. Fig. 12 is a horizontal section on the line 12, 12 of Fig. 7.

The end wall of the car is represented by the reference numeral 15. This end wall is movable and can either be placed in its normal position at the end of the car or when desired can be moved over to the position indicated as 15' in Fig. 6, thus excluding the part of the car immediately above the trucks from the space adapted to carry material. The side walls of the car comprise doors 17 hanging by hinges from the top side rails 16. The car floor comprises the stationary floor sections 18 on either side. The floor sections 20 are hinged at 19 adjacent to the stationary sections 18 and are adapted to lie flat in the same plane therewith, as indicated on the left of Fig. 2 or to lean back against the side wall, as indicated in the right of Fig. 2. It should be stated at this point that the hinged sections 20 do not extend the full length of the car, but only between the trucks. The floor over the trucks is indicated by the reference numeral 21, as shown in Fig. 4, and extends across continuously from one side of the car to the other. Between the trucks the sloping floor section 22 extends downwardly and inwardly from the inner edge of one of the side floor sections 18. Opposed to this are the doors 24 hinged at their upper edges 23. At the ends of the hopper bottom formed by the members 22 and 24 there is a sloping wall 25 with sloping side sections 25'. A chain 26 is attached to the door 24 and passing around its edge is wound about the longitudinal shaft 27, which extends under the car. This shaft 27 is adapted to be rotated by means of the lever 28, which has a pawl 29 adapted to engage a ratchet-wheel 30 on the shaft. A dog 31 pivoted at 32 is adapted to lock the shaft in any position and thus lock the door 24 in closed position when desired.

Having now given an outline description of the general construction of the car disclosed in this specification, I will proceed to describe in detail the various features which are more particularly involved in my invention.

Closely adjacent to the end of the hopper bottom is the transverse sub-bolster 35, shown in Fig. 5. The ends of this are attached by means of the flanges 37 to the intermediate sills 36. The end sill of the car is represented by the reference numeral 38. Between the end sill 38 and the sub-bolster 35 extend the continuous channel beams 39, which constitute the center sill of the car. The main bolster of the car is built up in sections, the sections 40 extending between the center sill 39 and the intermediate sill 36, and being secured thereto by means of the short channel shaped members 44. The sections 41 of the bolster extend between the intermediate sills 36 and the side sills 42 being secured to the latter by angle-iron corner pieces 45. The sections 43 of the bolster extend between the two members 39 of the center sill. Overlying all these sections of the bolster is the transverse horizontal plate 46, which extends clear across from side sill to side sill. This is reinforced by a smaller overlying plate 47. Underlying the sections of the bolster is the wide transverse plate 48, which is of sufficient width to extend to the sub-bolster 35 and is attached thereto. The outline of this under-plate 48 is indicated in dotted lines in Fig. 5. A smaller reinforcing plate 49 is attached below this. It will be observed that the intermediate sills and the side sills extend continuously throughout the length of the car, while the center sill extends continuously from the end sill to the sub-bolster. The overlying and underlying plates 46, 47, 48 and 49 and the extension of the plate 48 to the sub-bolster 35 make the main bolster very strong so as to enable it to withstand buffing shocks.

The side stakes are each formed by placing a channel section 51 and an angle iron section 50 with their webs adjacent, as seen in Fig. 5. A transverse gusset plate 52 is inserted between the intermediate sill 36 and the side sill 42, as shown in Fig. 2. A small piece 69 is riveted to the bottom end of the side stake 50—51 and projects downwardly therefrom and a horizontal angle-iron 53 is riveted to this piece 69 and to the gusset plate 52. Another gusset plate 54 has one end riveted to the side stake 50—51 and extends across over the side sill 42, as indicated in Fig. 9. A plate 55 (see Figs. 5 and 9) is riveted to the top flanges of the side sill 42 and the intermediate sill 36 and the gusset plate 54 is in turn riveted to the plate 55. This makes a strong construction for supporting the side stakes, the members 53 and 54 being spaced far enough apart to resist the leverage of the side stake, and the rivets through these members being subjected to a shearing stress.

Each corner stake is made of a channel stake 56 in combination with a pressed shape 57. For a certain distance above the floor level the pressed shape 57 is bent around in a curved portion 58, as shown in Fig. 12, and this is reinforced by a corresponding curved plate 62. The height of the plate 62 may be seen on referring to Fig. 7. When the end wall of the car is removed and a plow is dragged over the cars in a lengthwise direction for the purpose of unloading them, the curved members 58 and 62 will serve to guide the plow and also, because they are reinforced, they will serve to withstand shocks from the plow. The side stake members 50 and 51 are also riveted to curved members 70 on their inner faces, see Figs. 5 and 9 similar to the members 62 and for a similar purpose.

The hopper door 24 is made in sections and the sections are hinged separately, but are then united along their adjacent edges both by means of the overlapping plates 59 (see Fig. 6) and the edge straps 60 (see Figs. 1 and 2). It is much more convenient in manufacturing the doors to make them separate and hang them separately, but thereafter it is advantageous to unite them so as to operate them practically as one door. The structure just described accomplishes these results.

The transverse plate 61 (see Fig. 1) is placed across each end of the composite door 24. Thus it will be seen that as the door swings on its hinge axis 23 the end of the door will always abut closely against the diaphragm 61. Thus the only opening that will be afforded for the escape of material from the car will be between the free lower edge of the door 24 and the opposed lower edge of the sloping floor section 22. The diaphragm 61 prevents dumped material from getting over into the trucks or getting back and piling on the rail on the door side of the car when the door is open.

It will be noted that certain features of my invention are applicable to cars of a wide variety of types and are not limited to the type of car disclosed.

I claim:

1. In a hopper bottom car, an end sill, a main bolster, a sub-bolster, and longitudinal sill members extending continuously from the end sill to the sub-bolster, the main bolster comprising sections lying between the said longitudinal sill members.

2. In a hopper bottom car, an end sill, a main bolster, a sub-bolster, intermediate sills extending the whole length of the car, said sub-bolster extending continuously across between them, and a center sill extending continuously from the end sill to the sub-bolster, the main bolster comprising sections lying between the side, intermediate and center sills.

3. In a hopper bottom car, an end sill, a main bolster, a sub-bolster, longitudinal sill members extending continuously from the end sill to the sub-bolster, the main bolster comprising sections lying between the said longitudinal sill members, and an underlying plate attached to and extending between the main bolster and the sub-bolster.

4. In a hopper bottom car, an end sill, a main bolster, a sub-bolster, and longitudinal sill members extending continuously from the end sill to the sub-bolster, the main bolster comprising vertical sections lying between the said longitudinal sill members and top and bottom horizontal cover plates extending continuously across the longitudinal sill members.

5. In a car, a side sill, an intermediate sill, a transverse diaphragm connecting them, a side stake having its lower end attached to the outer face of the side sill, a connecting member below the side sill from the diaphragm to the lower end of the side stake, and a connecting member across above the side sill from the side stake to the top of the intermediate sill.

6. In a car, a side sill, an intermediate sill, a diaphragm between them, a side stake attached to the outside of the side sill opposite the diaphragm, and connecting members above and below the side sill from the side stake to the diaphragm.

In testimony whereof, I have subscribed my name.

WINFIELD H. YOST.

Witnesses:
 ROBERT M. ZIMMERMAN,
 BRITON O. SMITH.